(12) United States Patent
Rucinski

(10) Patent No.: US 8,065,807 B2
(45) Date of Patent: Nov. 29, 2011

(54) ELECTRONIC WEAPON SITE

(76) Inventor: Jerry Rucinski, Wisconsin Rapids, WI (US)

( * ) Notice: Subject to any disclaimer, the term of this patent is extended or adjusted under 35 U.S.C. 154(b) by 0 days.

(21) Appl. No.: 12/727,847

(22) Filed: Mar. 19, 2010

(65) Prior Publication Data
US 2010/0236535 A1    Sep. 23, 2010

Related U.S. Application Data

(60) Provisional application No. 61/161,966, filed on Mar. 20, 2009.

(51) Int. Cl.
F41G 1/467 (2006.01)
(52) U.S. Cl. .............................. 33/265; 124/87
(58) Field of Classification Search .............. 33/265; 124/87
See application file for complete search history.

(56) References Cited

U.S. PATENT DOCUMENTS

| | | | |
|---|---|---|---|
| 4,786,966 A * | 11/1988 | Hanson et al. ............... | 348/158 |
| 4,835,621 A | 5/1989 | Black | |
| 5,495,675 A | 3/1996 | Huang | |
| 5,686,690 A * | 11/1997 | Lougheed et al. ............ | 89/41.17 |
| 5,982,429 A | 11/1999 | Kamamoto et al. | |
| 6,070,355 A * | 6/2000 | Day ................................ | 42/106 |
| 6,272,785 B1 | 8/2001 | Mika et al. | |
| 6,539,177 B2 | 3/2003 | Parulski | |
| 6,539,661 B2 | 4/2003 | Hope | |
| 6,556,245 B1 | 4/2003 | Holmberg | |
| 6,952,881 B2 | 10/2005 | McGivern | |
| 7,124,531 B1 | 10/2006 | Florence et al. | |
| 7,162,806 B1 | 1/2007 | Swiggart | |
| 7,255,035 B2 | 8/2007 | Mowers | |
| 7,404,268 B1 | 7/2008 | Page | |
| 7,594,335 B1 * | 9/2009 | Schmitz ......................... | 33/265 |
| 7,647,922 B2 * | 1/2010 | Holmberg ...................... | 124/86 |
| 2002/0002788 A1 * | 1/2002 | Hope .............................. | 42/106 |
| 2002/0184810 A1 | 12/2002 | Day | |
| 2004/0204083 A1 | 10/2004 | Watanabe et al. | |
| 2005/0179799 A1 | 8/2005 | Umanskiy et al. | |
| 2006/0082730 A1 | 4/2006 | Franks | |
| 2006/0177218 A1 | 8/2006 | Moulton | |
| 2007/0035824 A1 * | 2/2007 | Scholz .......................... | 359/399 |
| 2007/0097351 A1 * | 5/2007 | York et al. ................... | 356/5.02 |
| 2007/0218966 A1 * | 9/2007 | Tilston et al. ................. | 463/5 |
| 2008/0094473 A1 | 4/2008 | Rom | |
| 2008/0163536 A1 | 7/2008 | Koch et al. | |
| 2010/0007580 A1 * | 1/2010 | Scales ............................. | 345/8 |
| 2010/0258628 A1 * | 10/2010 | Bay ............................. | 235/404 |

* cited by examiner

*Primary Examiner* — Christopher Fulton
(74) *Attorney, Agent, or Firm* — Paparella & Associates, PC; Joseph A. Paparella

(57) ABSTRACT

A weapon sight to facilitate alignment a weapon with a target comprises a housing further comprising a video camera for generating a first video signal corresponding to a first field of view, a processor for processing the first video signal into a second video signal corresponding to a second field of view and outputting the second video signal to a video display, and a reticle disposed on the video display, wherein one of the first or the second video signals is electronically positionable with respect to other of the second or first video signal.

24 Claims, 14 Drawing Sheets

ELECTRONIC WEAPON SITE

CROSS REFERENCE TO RELATED APPLICATIONS

This application claims the benefit of the filing date of U.S. provisional application Ser. No. 61/161,966 entitled "Sighting Device" which was filed on Mar. 20, 2009 and which is herein incorporated by reference.

BACKGROUND OF THE INVENTION

The present invention relates to a weapon site generally, and more specifically to an electronic weapon site.

Hunting, target shooting, and other related activities linked to the set-up, operation, and enjoyment of weapons such as firearms and bows has evolved from a once necessary part of life, to a multi-billion dollar recreational industry.

Sighting systems are a crucial component to any weapon used for hunting or target practice and numerous types of sighting systems are known to be used in conjunction with firearms, bows, and the like. However, setting the sighting system can be difficult when the individual who is using the weapon inconsistent in their aiming or firing techniques. For example, at times a second person is utilized to monitor the user's aiming and firing techniques in order to help the user properly sight the weapon and improve the manner in which it is being used.

The popularity of optically displayed and/or recording devices has been on the increase over the last several years, and with the advent of small optical (e.g., video) recording devices, the sportsperson now has the ability to electronically sight-in, view, and record these shooting events for subsequent playback.

Various electronic sights wherein the video or image is integrated with the sighting mechanism have been developed for use in weapons. However, these existing sights have numerous drawbacks. Conventional sights are commonly large and difficult to adjust. These sights are complicated and difficult to install, and do not allow for the installation of the display in numerous configurations according the sportsperson requirements. Nor do they allow for configuration for either a left-handed or right-handed sportsperson. Still further, these conventional sights adjust the reticle with respect to the display thereby decreasing the accuracy. Further yet, these conventional sights are not suitable for use in low light conditions. Additionally, the sportsperson may want to record their efforts. These events may comprise recording the target prior to firing the weapon; recording the trajectory of the shot; recording the target as it is being struck; and recording and/or determining the error of the shot.

Accordingly, a need exists for optical imaging and sighting devices, systems, and methods therefor that allow for the accurate sighting-in and recordation of shooting events when used in conjunction with a weapon such as a gun or a bow, as well as devices, systems, and methods that are simple in operation and which have the ability to be configurable for either the left-handed or right-handed sportsperson. Therefore, an electronic weapon site that solves the aforementioned disadvantages and having the aforementioned advantages is desired.

SUMMARY OF THE PRESENT INVENTION

The aforementioned drawbacks and disadvantages of these former electronic weapon sites have been identified and a solution is set forth herein by the inventive electronic weapon site which includes a weapon sight to facilitate alignment a weapon with a target, wherein the weapon sight comprises a housing, the housing further comprising a video camera for generating a first video signal corresponding to a first field of view, and a processor for processing the first video signal into a second video signal corresponding to a second field of view and outputting the second video signal to a video display. A reticle is disposed on the video display, wherein one of the first or the second video signals is electronically positionable (e.g., adjustable or movable) with respect to other of the second or first video signal.

Another aspect of the present invention includes a bow sight to facilitate alignment with a target, wherein the bow sight comprises a housing including a video camera for generating a first video signal corresponding to a first field of view. Also included is a processor for processing the first video signal into a second video signal corresponding to a second smaller field of view and outputting the second video signal to a touch screen video display, the touch screen display including a stationary reticle which is centrally disposed. Further, the first video signal is electronically positionable with respect to the second video signal through user inputs via the touch screen display.

In another aspect of the present invention, a video sight mounting bracket for a bow includes a reversible video sight mounting bracket comprising a housing mount portion and a riser mount portion. The housing mount portion is adapted to retain a video sight housing, and the riser mount portion is adapted to mount to the riser of a bow. The mounting bracket further includes a first and a second side, and a longitudinal axis defining a first and a second half, wherein the first side is a mirror image of the second side, and the first half is a mirror image of the second half.

And still in another aspect of the present invention, an ambidextrous video sight assembly for a bow comprises a mounting bracket which is adapted to be operatively coupled to a bow and further includes a housing mount portion and a riser mount portion, wherein the housing mount portion is adapted to retain a video sight housing, and the riser mount portion is adapted to mount to at least one of a left or a right side of a bow. The video sight also includes a video sight housing comprising a video display unit, wherein the video display unit is adapted to electronically rotate a displayed image, for example by 180 degrees. The housing further includes a single mountable side which is adapted to mount the housing to the housing mount portion of the mounting bracket. In this manner, the video display may be mounted to the bow in any one of a forward, aft, left and right side position of a riser of the bow via the single mountable side.

In yet another aspect of the present invention a method of sighting a weapon is disclosed and comprises: providing a weapon sight comprising a video camera for generating a video signal and a display; displaying the video signal on the display; establishing a first point of reference on the display representative of a desired position on a target; establishing a second point of reference on the display representative of an actual position of a landed projectile on the target; determining an offset between the second point of reference and the first point of reference; and offsetting the video signal by the determined offset.

In still another aspect of the present invention a method of sighting a weapon is disclosed and comprises: providing a weapon sight comprising a video camera for generating a first video signal or image corresponding to a first field of view, a processor for processing the first video signal into a second video signal or image corresponding to a second field of view; receiving the first video or image signal comprising the first field of view; processing (e.g., cropping) the first video or image signal comprising the first field of view into the second video signal comprising the second field of view; outputting the second video signal or image to a video display; displaying the second video or image signal on the display; displaying a reticle on the display; establishing a first point of reference via the display representative of a desired position on a target by positioning the reticle at the desired position; establishing a second point of reference representative of an actual position of a landed projectile on the target, while simultaneously positioning the reticle on the first point of reference; determining an offset of the second point of reference in relation to the first point of reference; offsetting one of the first or the second video signals with respect to other of the second or first video signal such that the second point of reference coincides with the first point of reference; and displaying the coincident reticle on the display.

In yet another aspect, a weapon sight to facilitate alignment a weapon with a target comprises a housing further comprising a video camera for generating a first video signal corresponding to a first field of view, and a display, wherein an adjustable is reticle disposed on the display. Also included is a a processor for processing the first video signal into a second video signal corresponding to a second field of view, and outputting the second video signal to a video display. a non volatile memory is included for storing the position of at least one of the adjustable reticle disposed on the display and the first or the second video signal, wherein one of the first or the second video signals is electronically positionable with respect to other of the second or first video signal.

In still another aspect, a method of sighting a weapon comprises: providing a weapon sight comprising a video camera for generating a video signal, a display, a processor, and a non volatile memory; displaying the video signal on the display; displaying a reticle on the display; establishing a first point of reference, coincident with the reticle, representative of a desired position on a target; establishing a second point of reference representative of an actual position of a landed projectile on the target; determining an offset between the second point of reference and the first point of reference; offsetting one of the reticle or the video signal by the determined offset; storing the determined offset in the non volatile memory; recalling the stored determined offset after the weapon sight has been powered off; and displaying one of the reticle or the video signals by the stored determined offset.

In this respect, before explaining the preferred embodiment of the disclosure in detail, it is to be understood that the disclosure is not limited in its application to the details of the construction and the arrangement set forth in the following description or illustrated in the drawings. To with, the electronic weapon site of the present disclosure is capable of other embodiments and of being practiced and carried out in various ways. Also, it is to be understood that the phraseology and terminology employed herein are for description and not limitation. Where specific dimensional and material specifications have been included or omitted from the specification or the claims, or both, it is to be understood that the same are not to be incorporated into the claims, unless so claimed.

As such, those skilled in the art will appreciate that the conception upon which this disclosure is based may readily be used as a basis for designing other structures, methods, and systems for carrying out the several purposes of the present invention. It is important therefore that the claims are regarded as including such equivalent constructions, as far as they do not depart from the spirit and scope of the present invention.

Further, the purpose of the Abstract is to enable the United States Patent and Trademark Office, the public generally, and especially the scientists, engineers, and practitioners in the art who are not familiar with the patent or legal terms of phraseology, to learn quickly, from a cursory inspection, the nature of the technical disclosure of the application. Accordingly, the Abstract is intended to define neither the invention nor the application, which is only measured by the claims, nor is it intended to be limiting as to the scope of the invention in any manner.

These and other objects, along with the various features and structures that characterize the invention, are pointed out with particularity in the claims annexed to and forming a part of this disclosure. For a better understanding of the electronic weapon site of the present disclosure, its advantages, and the specific traits attained by its use, reference should be made to the accompanying drawings and other descriptive matter in which there are illustrated and described the preferred embodiments of the invention.

As such, while embodiments of the electronic weapon site are herein illustrated and described, it is to be appreciated that various changes, rearrangements, and modifications may be made therein without departing from the scope of the invention as defined by the claims.

BRIEF DESCRIPTION OF THE DRAWINGS

As a compliment to the description and for better understanding of the specification presented herein, 14 pages of drawings are disclosed with an informative, but not limiting, intention.

DETAILED DESCRIPTION OF THE PREFERRED EMBODIMENT

The best mode for carrying out the invention is presented in terms of the preferred embodiment, wherein similar referenced characters designate corresponding features throughout the several figures of the drawings.

Figure 1:
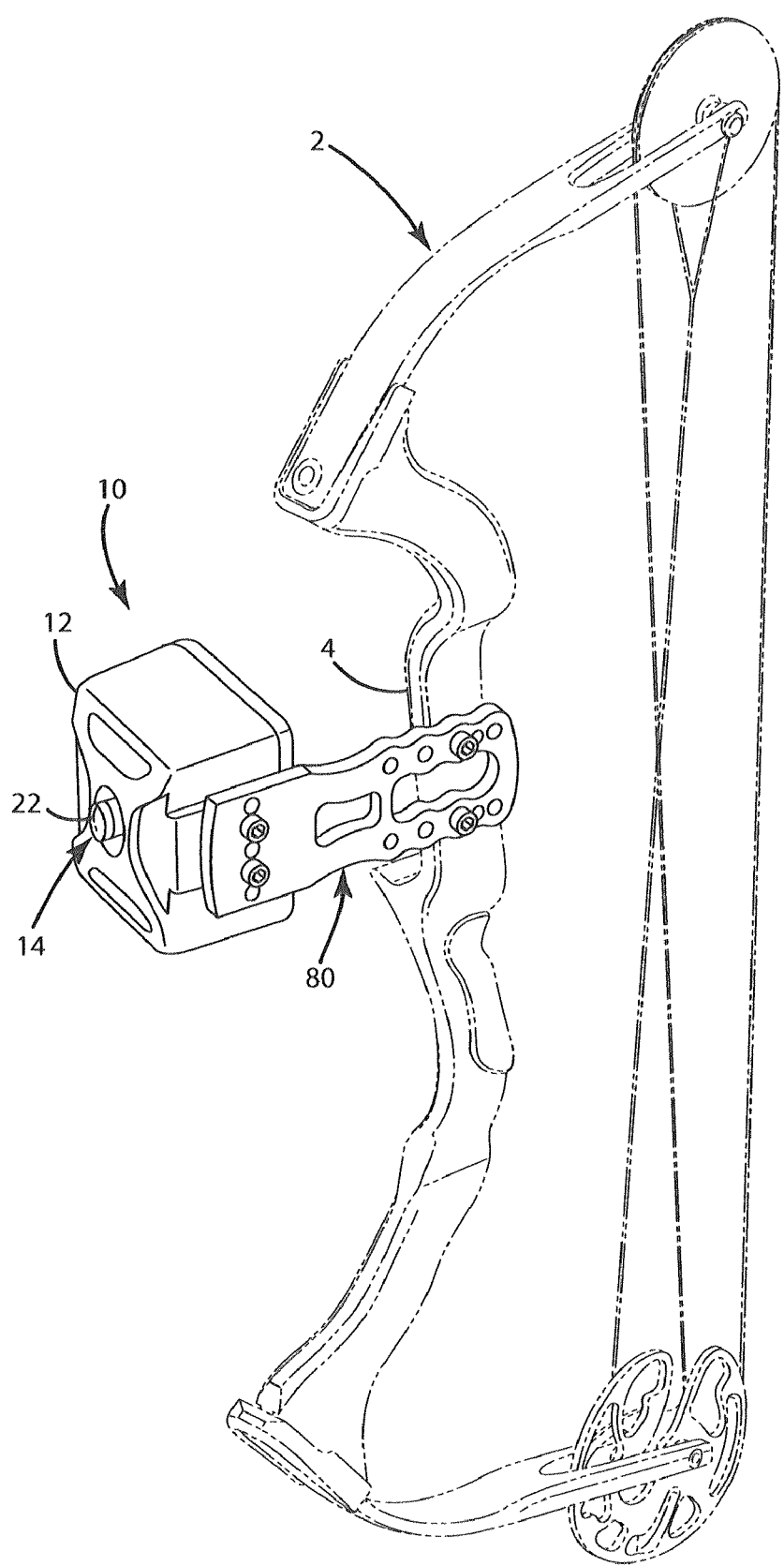
FIG. 1 is a front perspective view of an embodiment of the weapon site of the present invention, mounted to a left handed how.
Figure 2:
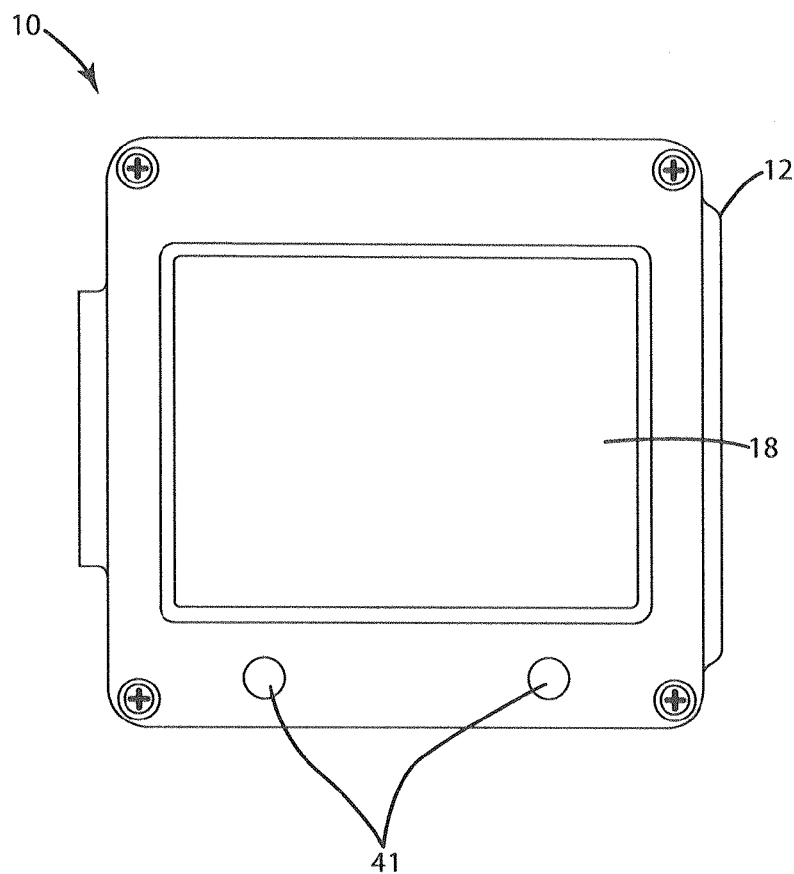
FIG. 2 is a rear view of the weapon site of FIG. 1.
Figure 3:
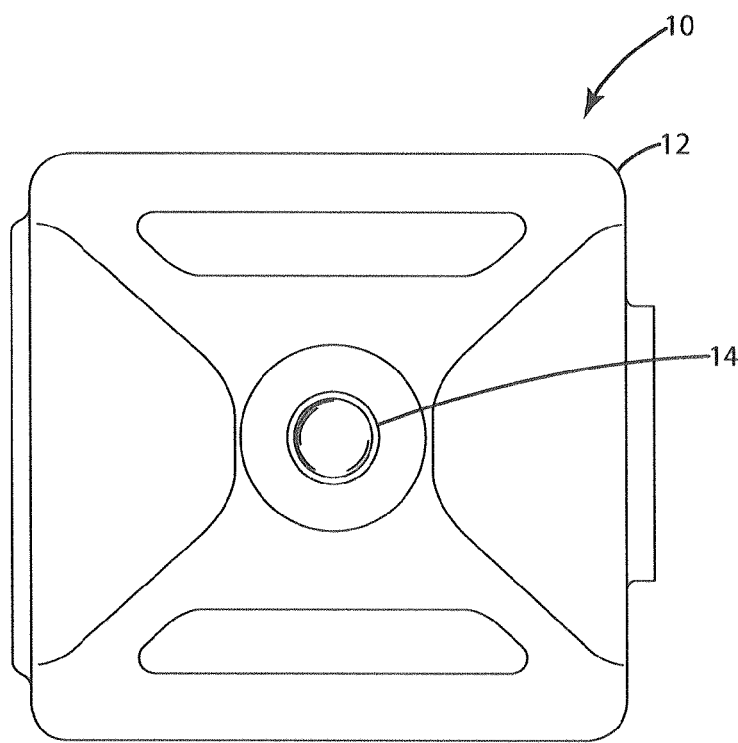
FIG. 3 is a front view of the weapon site of FIG. 1.

For purposes of description herein, the terms "upper", "lower", "right", "left", "rear", "front", "vertical", "horizontal", and derivatives thereof, shall relate to the invention as oriented in FIG. 1. However, it is to be understood that the invention may assume various alternative orientations, except where expressly specified to the contrary. It is also to be understood that the specific devices and processes illustrated in the attached drawings and described in the following specification are exemplary embodiments of the inventive concepts defined in the appended claims. Hence, specific dimensions and other physical characteristics relating to the embodiments disclosed herein are not to be considered as limiting, unless the claims expressly state otherwise.

Reference will now be made in detail to the present preferred embodiments of the invention, examples of which are illustrated in the accompanying drawings. Wherever possible, these same referenced numerals will be used throughout the drawings to refer to the same or like parts. Like features between the various embodiments utilize similar numerical designations. Where appropriate, the various similar features have been further differentiated by an alphanumeric designation, wherein the corresponding alphabetic designator has been changed. Further, the dimensions illustrated in the drawings (if provided) are included for purposes of example only and are not intended to limit the scope of the present invention. Additionally, particular details in the drawings which are illustrated in hidden or dashed lines are to be considered as forming no part of the present invention.

As used herein, the term weapon is meant to be used and defined in its general and ordinary sense. To with, any device that launches, shoots, or projects a projectile. These weapons are used in numerous situations, for numerous activities and can be used in military, personal, and sporting activities. For example only, the weapon may comprise a gun or a bow, and may be used in hunting and target practice. Therefore, with the broad applications being set, for brevity, the applicant will discuss herein the inventive weapon site as it works with and relates to a bow. Of course, this is not meant to be limiting in any manner and these sights may take on numerous configurations, and may be used for numerous purposes as is generally known within the art.

In a broader sense, sighting systems are a crucial component to any weapon used for hunting or target practice and numerous types of sighting systems are known to be used in conjunction bows. However, setting the sighting system can be difficult. In response to this, video sighting systems have seen an increase on popularity over the last several years, and with the advent of small video recording devices, the sportsperson now has the ability to sight-in, view, and record these shooting events electronically and for subsequent playback.

Various electronic sights wherein the video or image is integrated with the sighting mechanism have been developed for use in bows, however, these existing sights have numerous drawbacks. These available sights are commonly large and difficult to adjust; are complicated and difficult to install; do not allow for the installation of the display in numerous configurations according the sportsperson requirements, nor do they allow for configuration for use by both a left-handed or right-handed sportsperson. Still further, the conventional sights having an adjustable reticle, whereby the reticle is adjusted with respect to the display thereby decreasing the accuracy. Further yet, these conventional sights are not suitable for use in low light conditions. Additionally, the sportsperson may want to record their shooting efforts.

Accordingly, a need exists for optical imaging and sighting devices, systems, and methods therefor that allow for the accurate sighting-in and recordation of shooting events when used in conjunction with a weapon such as a gun or a how, as well as devices, systems, and methods that are simple in operation and which have the ability to be configurable for either the left-handed or right-handed sportsperson. Therefore, an electronic weapon site that solves the aforementioned disadvantages and having the aforementioned advantages is disclosed herein.

The disadvantages and drawbacks of the prior art are overcome through the electronic weapon site of the present invention, wherein one preferred embodiment is disclosed in FIG. 1.

The weapon site of the present invention allows for the recordation of various shooting events, as well as the electronic alignment of the aim of the weapon. The weapon site disclosed herein fulfills these needs through the inventive video sight which adjusts the field of view of one or more field of views, for example through user input, as well as provides recording capabilities. Additionally, the video sight may also include features such as IR capability; an ambidextrous mounting capability; image rotation; external, removable memory; a centrally disposed, fixed reticle; touch screen controls, as well as numerous other features.

Referring now to FIGS. 1-6, there is shown a weapon sight 10 to facilitate alignment of a weapon with a target wherein the weapon sight is mounted to a weapon (e.g., a bow 2) and comprises a housing 14, the housing 14 further comprising a video camera 14 for generating a first video signal 24 corresponding to a first field of view 26. Also included is a processor 16 for processing the first video signal into a second video signal 28 corresponding to a second field of view 30 and outputting the second video signal 28 to a video display 18. A reticle 20 is disposed on display 18 and one of the first or the second video signals, 24 and 28 respectively, is electronically positionable, that is to say adjustable, movable, or otherwise positionable with respect to other of the second or first video signal, 28 and 24 respectively.

Figure 4:
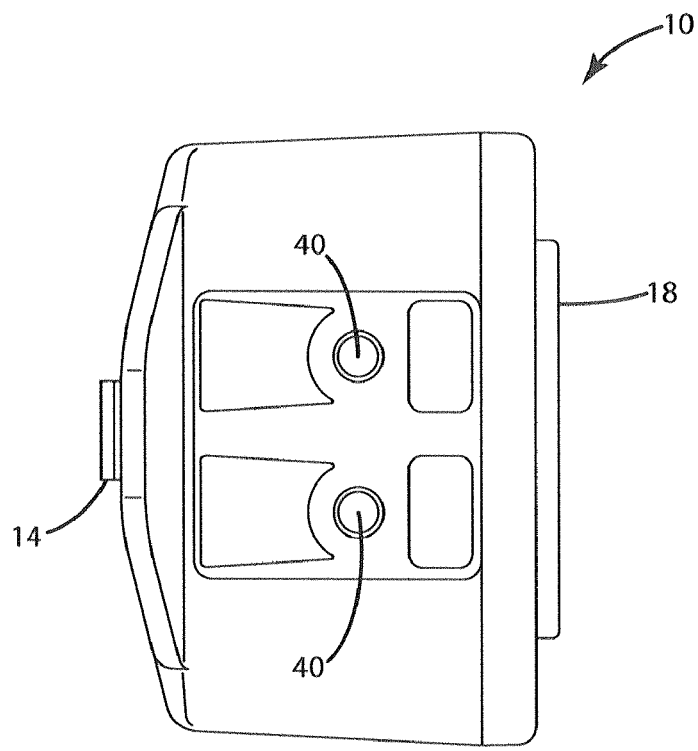
FIG. 4 is a right side view of the weapon site of FIG. 1.
Figure 5:
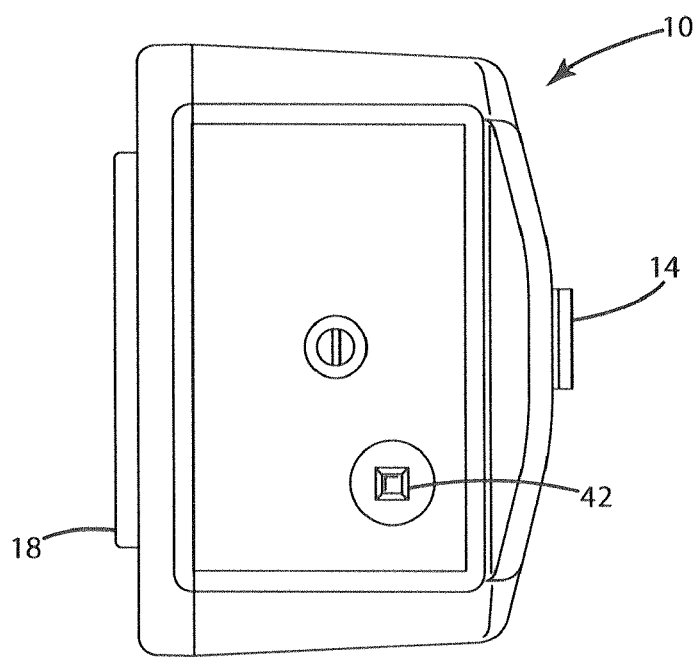
FIG. 5 is a left side view of the weapon site of FIG. 1.

As illustrated in FIGS. 2-5, housing 12 comprises a case, shell or other covering and is used to position, house and protect video camera 14, processor 16, and display 18. Housing 12 also includes mounting features 40 which may be used to mount the housing 12 to the bow 2 directly or through a mounting bracket such as mounting bracket 80 as described herein below. While any known mounting feature 40 may be utilized, illustrated in FIG. 4 is threaded receptacle for receiving a threaded fastener therethrough. Illustrated in FIG. 5 is one location for the on/off switch 42.

There are several existing technologies that can be used for image capturing by video camera 14 and these may comprise an Infrared (IR) imaging sight and for example only may comprise IR LED's. However, any known imaging capturing device may be used including but not limited to, charge coupled devices (CCD) and Complimentary Metal-Oxid Semiconductors (CMOS) technologies. The image or video captured by video camera 14 will comprise a first video signal 24 comprising a first field of view 26. The first field of view is typically determined by the specifics, characteristics, and design of the video camera. This first field of view is captured by the lens 22, wherein the first video signal 24 from camera 14 is sent to the processor 16.

Figure 6:
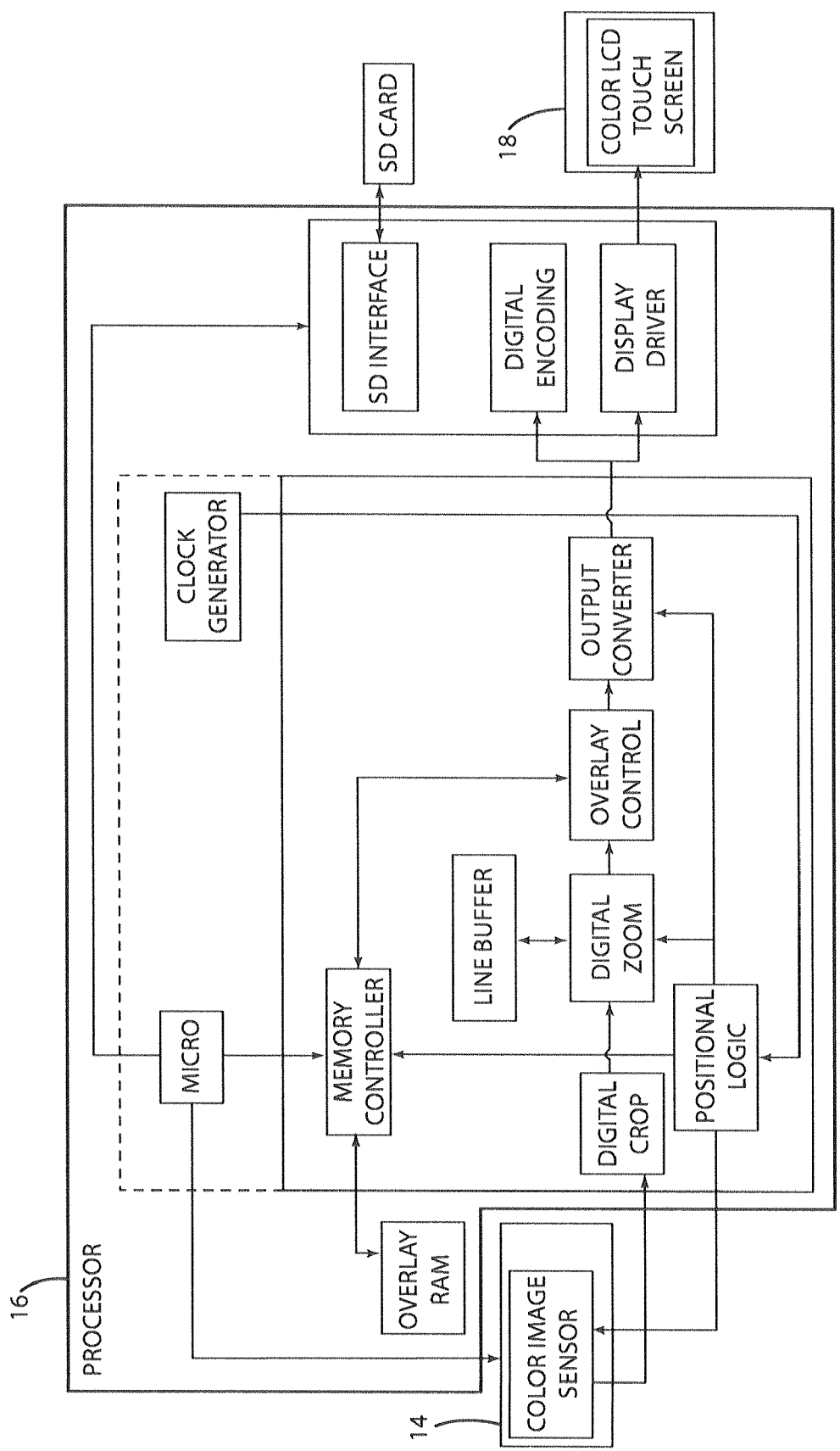
FIG. 6 is a block diagram of one embodiment of the weapon site of the present invention.

As illustrated in FIG. 6, processor 16 may be housed with housing 12 and may comprise any known general purpose programmable microprocessor. The functions of processor 16 may include, inter alia, the ability to receive, store, play, and record one or more frames of image data, adjusting the image data, controlling one or more aspects of the video camera, adjusting the image in a bi-directional manner; rotating the displayed image, and outputting the second processed video signal 28 comprising a second field of view 30 to the display 18. The processor may also include additional features such as removable external memory, the ability to capture still images, variable frame capture rates when used in a video mode, and the ability to display more than one reticle corresponding to differing target distances. Although processor 16 may take on numerous configurations, FIG. 6 illustrates a block diagram of one embodiment thereof.

Figure 7:
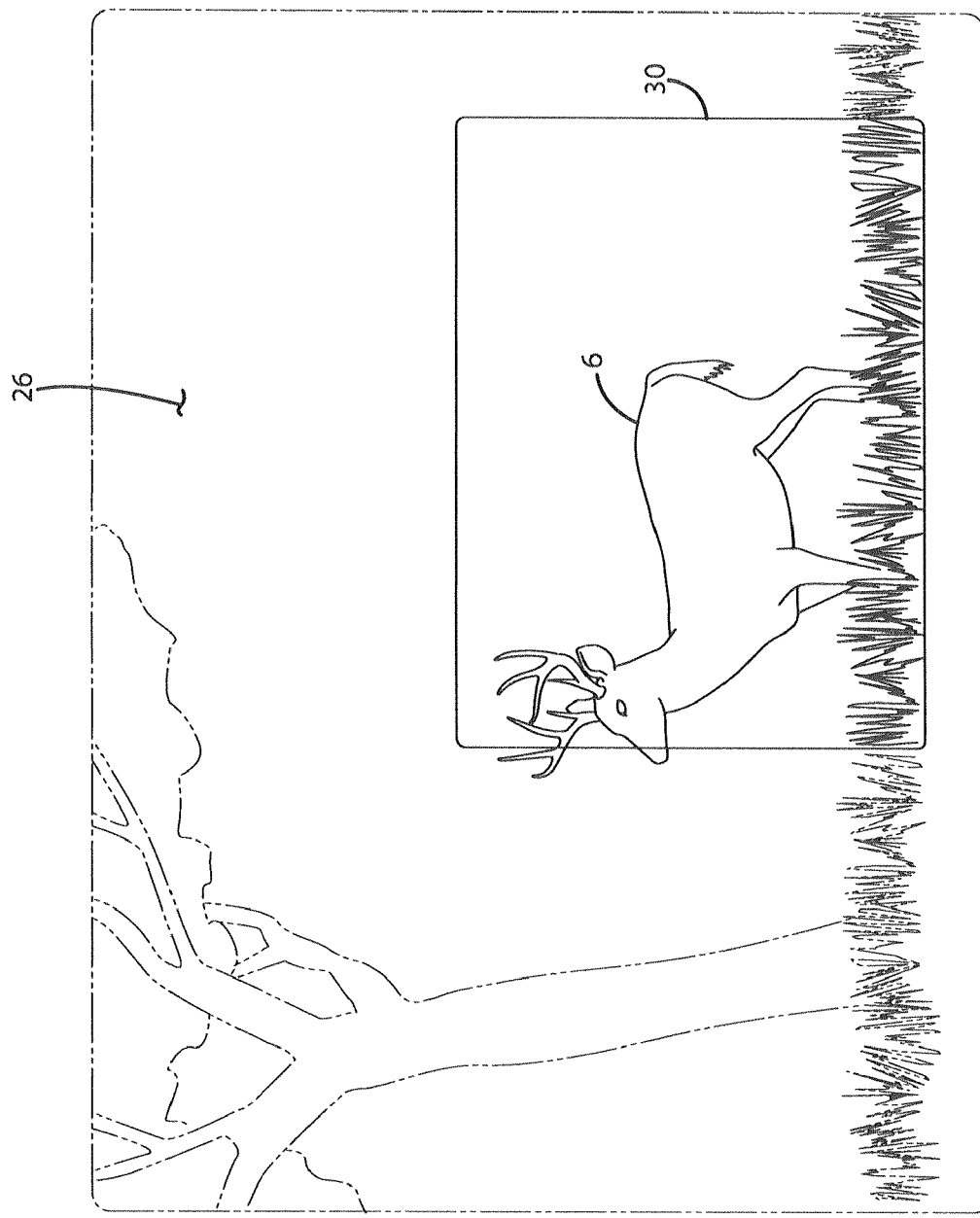
FIG. 7 is a front view of one embodiment of the first and second fields of view of the present invention.

As illustrated in FIG. 7, Second video signal 28 comprises the second field of view 30 which is display on display 18. While the first and second field of views may be the same, in one embodiment, the second field of view 30 is a smaller or cropped field of view as compared to the first field of view 26. For example, second field of view 30 may comprise 25% of the first field of view 26. Second video signal 28 is then output and displayed on video display 18. A reticle 20 is disposed on display 18, typically being centrally located within the display, and in one embodiment the reticle 20 is electronically disposed on the display via the processor. However, in another embodiment, a non-electronic reticle may be disposed, physically, on the display. In one embodiment, display 18 is an LCD touch screen display and comprises a resolution of 240×320. Additionally, one of the first or the second video signals, 24 and 28 respectively, are rotatable, typically via the processor, such that the display 18 may be mounted in varying configurations. This allows the video display to be mounted in either left or right handed configurations by simply remounted the housing and electronically rotating the displayed image 180 degrees.

Figure 8:
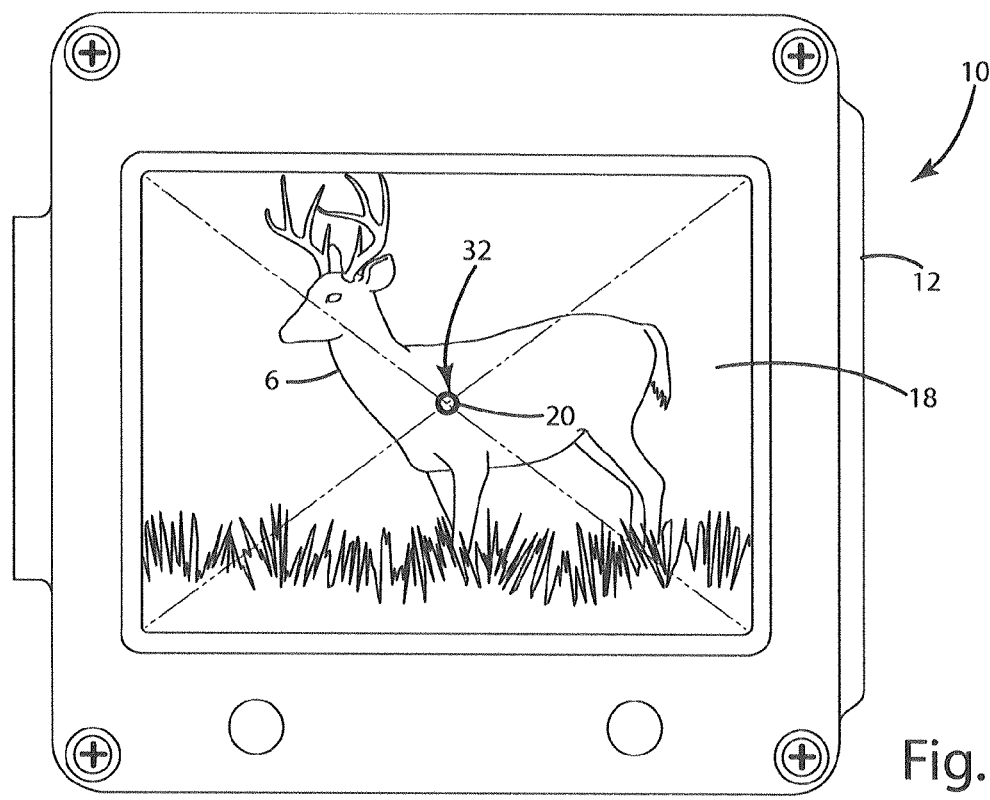
FIG. 8 is a front view of the display illustrating the establishment of a first point of reference according to one embodiment of the present invention.
Figure 9:
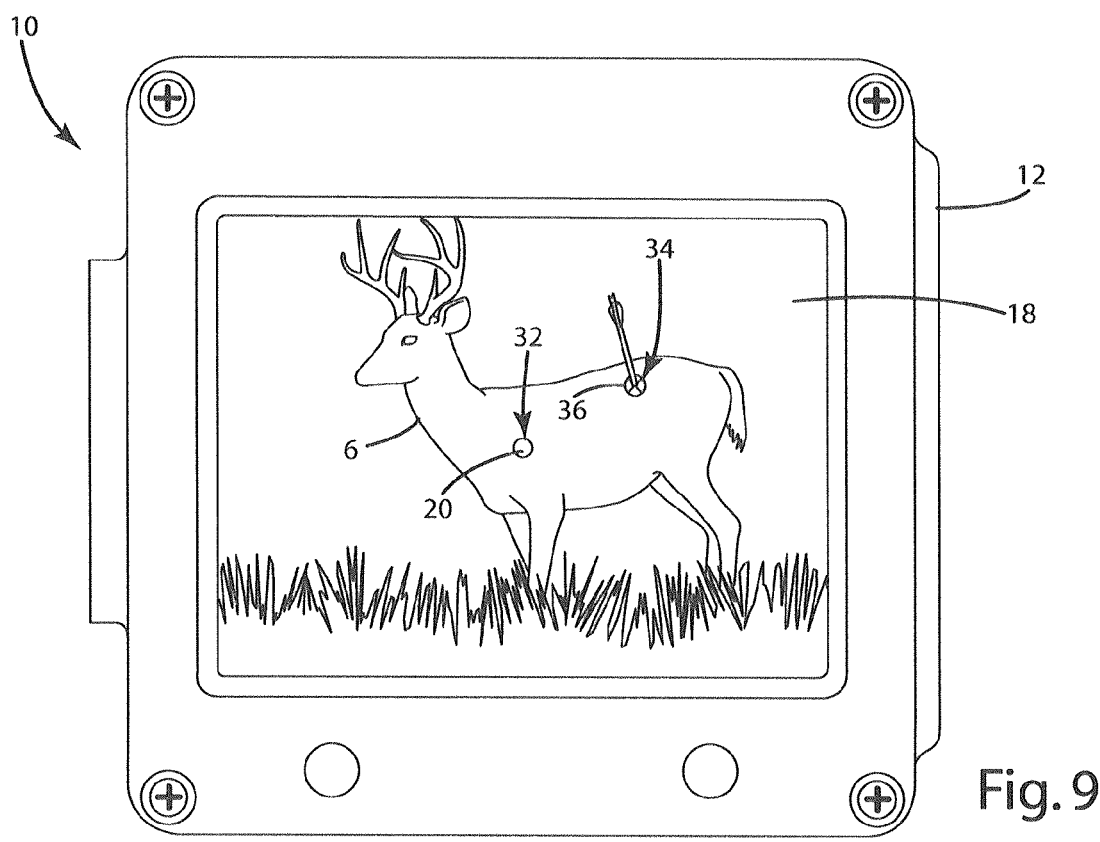
FIG. 9 is a front view of the display illustrating the first point of reference and an actual position of a landed projectile according to one embodiment of the present invention.
Figure 10:
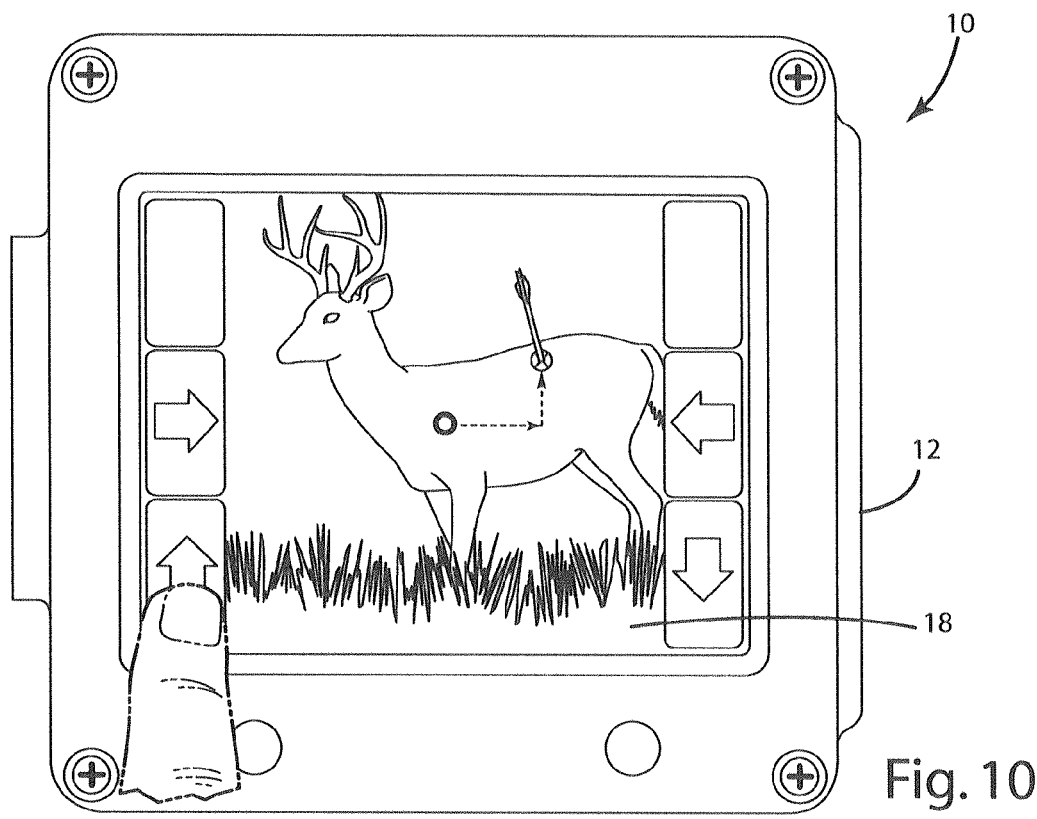
FIG. 10 is a front view of the display illustrating the establishment of a second point of reference according to one embodiment of the present invention.
Figure 11:
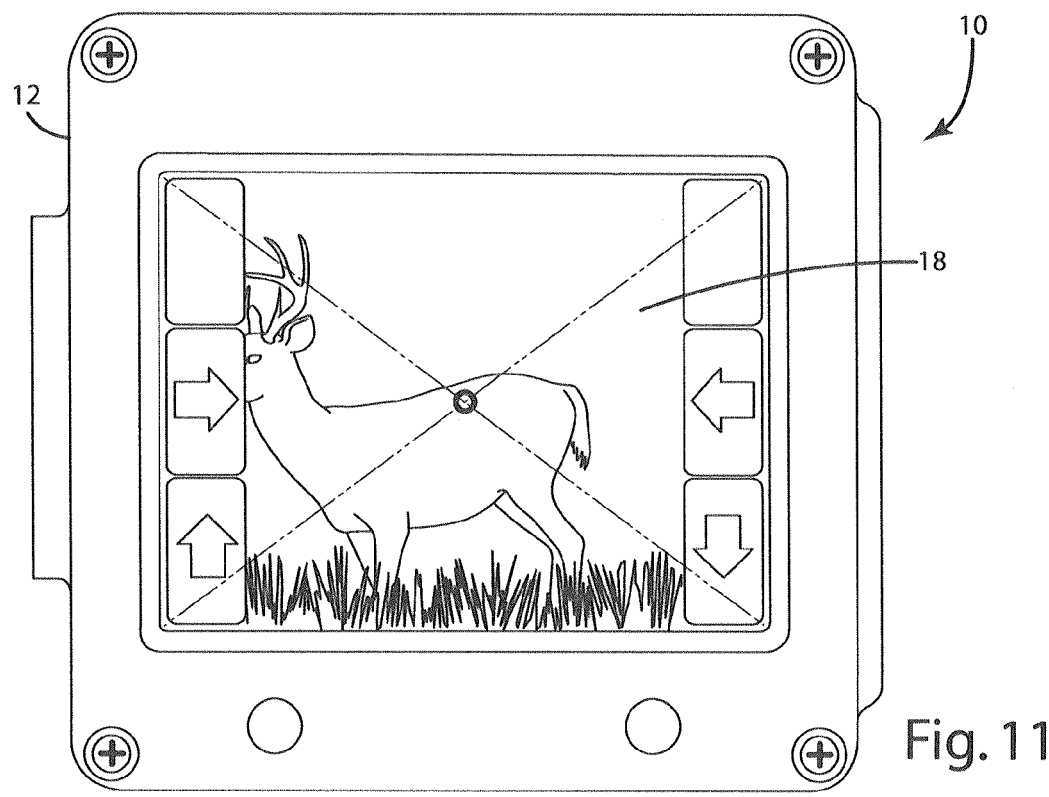
FIG. 11 is a front view of the display illustrating the offset video signal or the offset reticle according to one embodiment of the present invention.
Figure 12:
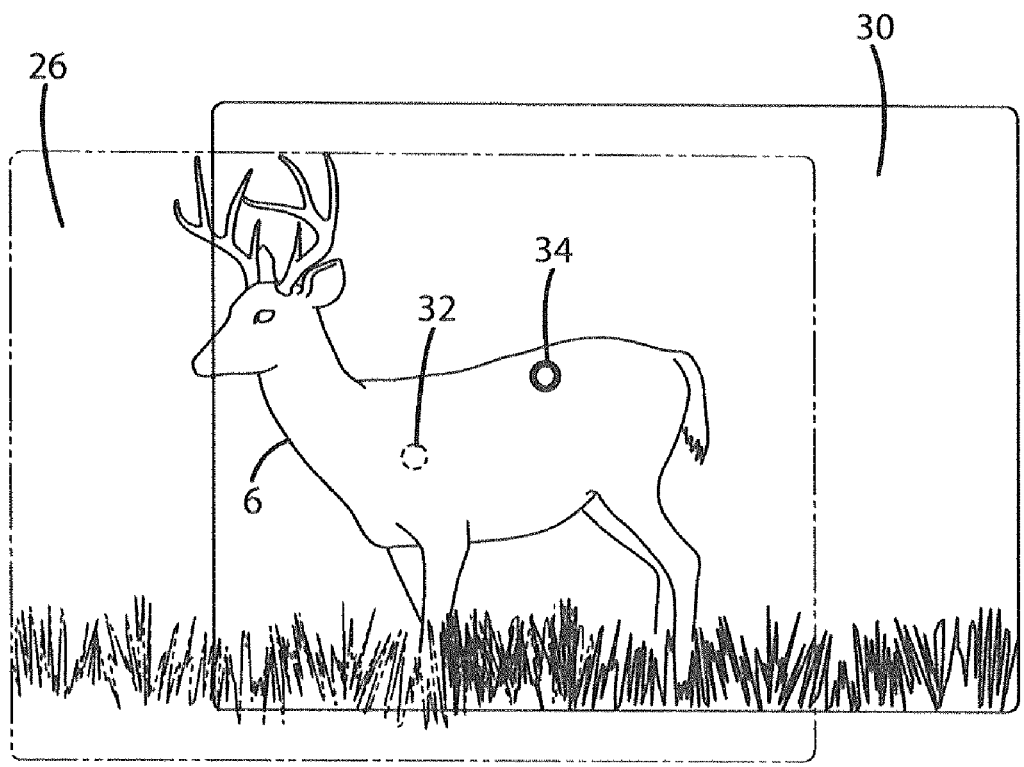
FIG. 12 is a front view representative of the video signal being offset.

As illustrated in FIGS. 8-12, in one embodiment the present invention is a processor-based video sight wherein the display 18 utilizes the second video signal 28 for targeting and adjustment. The first video signal 24 is received from camera 14 and processed to a smaller, cropped image comprising the second field of view 30 which is displayed on display 18. The marksman first establishes the first point of reference 32 representative of a desired position on a target 6 by positioning the reticle 20 on display 18 at the desired position (FIG. 8). When so positioned the marksman shoots the projectile (e.g., an arrow) (FIG. 9). Recording of this event may also occur. Once the projectile has landed, the marksman uses display 18 to observe the actual placement of the projectile and establishes a second point of reference 34 representative of an actual position of the landed projectile on the target 6 while simultaneously positioning the reticle 20 on the first point of reference 32 (FIG. 10). This is accomplished by presenting on the display 20 a locator mark 36 that the marksman will move to the second point of reference 34, for example via inputs on the touch screen display 18. Once the locator mark 36 is positioned on the second point of reference 34, the marksman signifies this through a user input (e.g., pressing enter on the touch screen display). The processor then determines the offset 38 between the first and second point of references, 32 and 34 respectively, for example by determining the pixel offset between them, and adjusts one of the first or the second video signals, 24 and 28 respectively, by the determined offset such that the second point of reference 34 now coincides with the first point of reference 32 (FIGS. 11-12). The adjusted image with the now coincident points of view is then displayed on display 18. Typically, the adjusted image will be centrally located according to the coincident points of reference and a reticle will therealso be displayed. In one preferred embodiment, it is the first video signal 24 that is adjusted or moved by the determined offset 38. Recording these events may also be accomplished by recording either still images or video.

Figure 13:
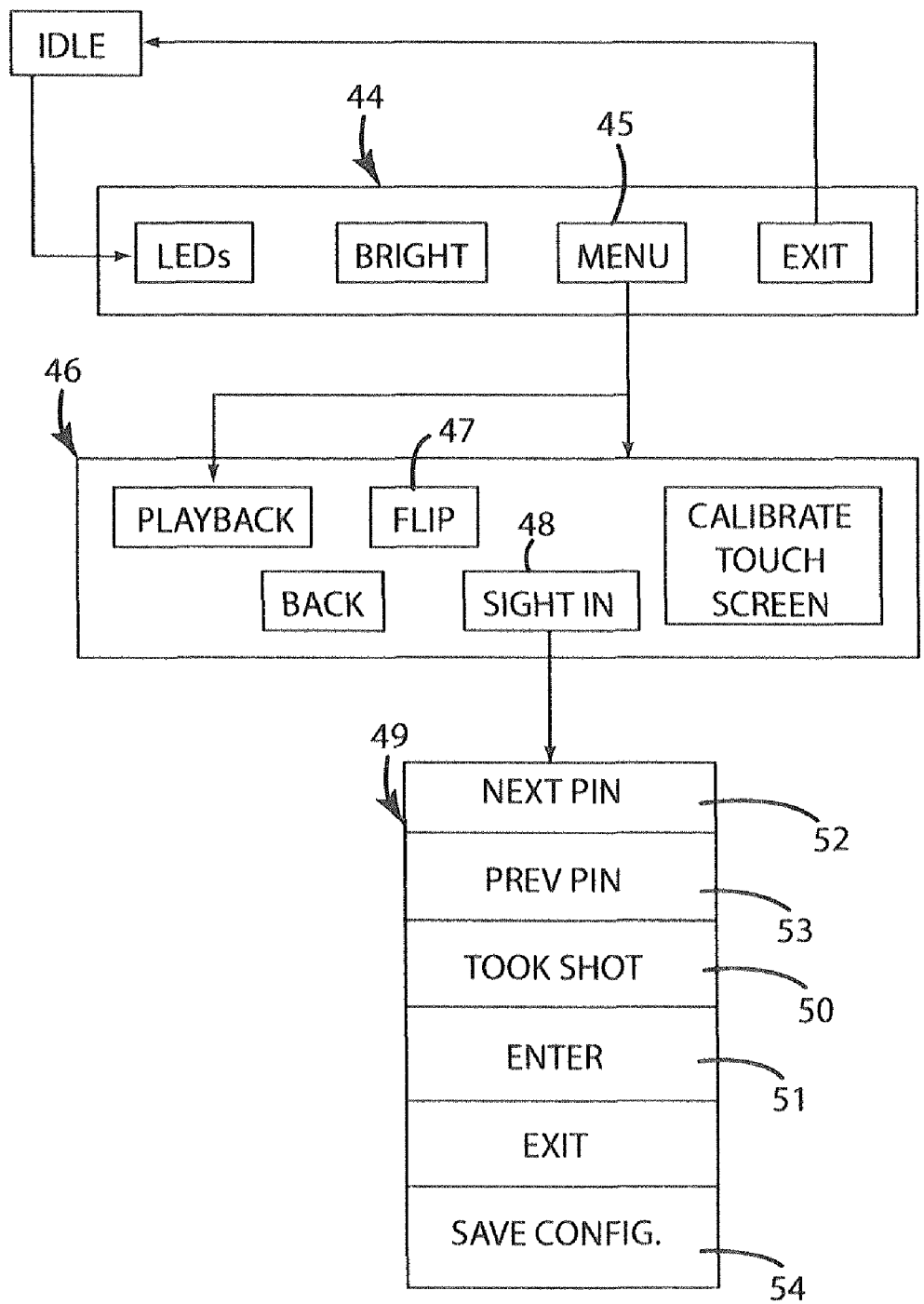
FIG. 13 is a flow chart according to one embodiment of the present invention.

FIG. 13 illustrates one embodiment of the menu configuration for user input that may be utilized. This particular depicted configuration is suitable for use on a touch screen display. In this particular embodiment, once unit 10 is turned on, recording starts automatically. Upon activation, the initial screen shows an initial menu 44. Utilizing a touch screen display, the user simply presses the option or function corresponding to the desired activity, wherein each function will generally have a sub-menu associated thereto. Of particular interest in the Menu function 45 with its associated sub-menu 46. As illustrated, sub-menu 46 may comprise, inter alia, an option 47 to facilitate rotation the displayed image, as well as a sight in option 48. With respect to the sight in feature, one embodiment will yield a sub-menu 49 wherein the user may facilitate the sighting in of one or more sights disposed on display 18.

Utilizing the sight-in function, and sighting in the device as described above, in order to sight-in reticle 20, the user will take their shot at the target 6 and then will choose option 50. Upon pressing option 50, the locator mark will appear on display 18. The user then moves mark 36 to the actual landing point of the arrow and enters this offset into the processor by choosing the enter function 51. The processor will then calculate the offset 38 and offset the displayed image. The result is a purely electronic sight 10 which requires no mechanical adjustments.

In this manner, a novel one shot sight-in feature has been developed, whereby the sportsperson can completely sight-in a weapon with a single shot. This contributes to the ease of use of the sight 10, increases the overall enjoyment of the shooting experience, as well as reduces the cost to sight-in the weapon by saving ammunition, as multiple shots are no longer required to sight-in a weapon.

Figure 14:
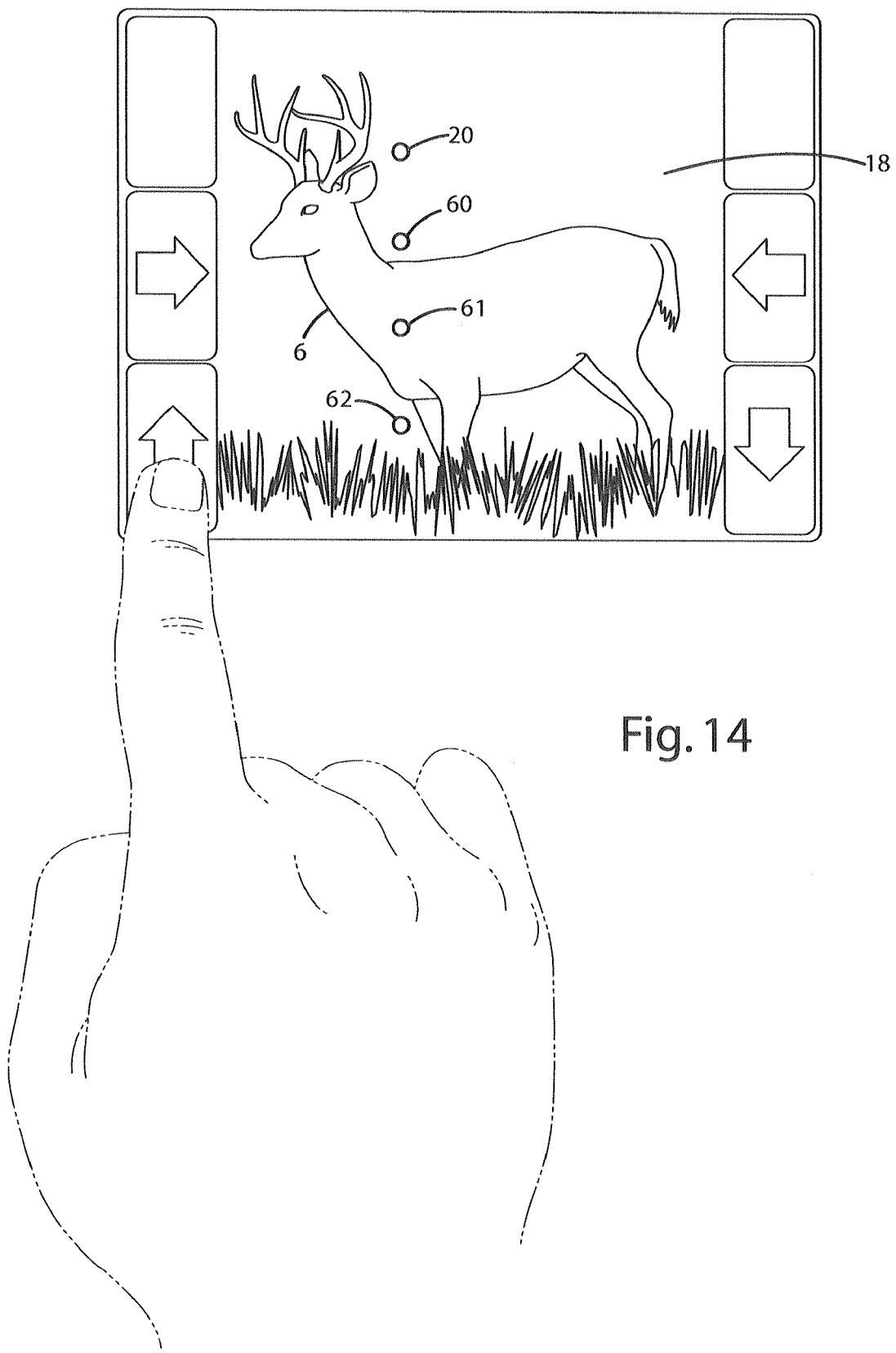
FIG. 14 is a front view of the display illustrating multiple reticles and the adjustment thereof according to one embodiment of the present invention.

Additionally, as illustrated by FIG. 14, the display and processor may be configured to display more than one reticle. As illustrated, reticles 20, and 60-62 are shown on the display and, for example, may represent the correct placement for a 20 yard shot distance via reticle 20, and 30, 40, and 50 yard shots via reticles 60, 61, and 62 respectively. The user may sight in these additional reticles in the same manner as described above and utilizing the functions 52 and 53 as displayed in FIG. 13 for assigning their respective offset. It is worth noting that once reticle 20 has been properly aligned or offset in the processor utilizing the bi-directional offset as described herein, the corresponding reticles 60-62 need only be aligned in one direction, that direction being related to the height of the shot, as the lateral offset would have been adjusted already within the processor during the sighting-in of reticle 20.

Still further, yet another novel feature to this system is that utilizing the save function 54, the processor or other storage is capable of storing numerous configurations. For example, utilizing non-volatile storage which may retain the stored information even when not powered. In a non-limiting manner, illustrative examples of non-volatile memory may include read-only memory, and flash memory. However, any type of non volatile memory may be used. In this manner, a sportsperson can mount the display 10 to a bow, sight-in one or more reticles, and save the configuration. The sportsperson can then mount the system 10 to a gun, sight-in one or more reticles, and save this alternate configuration as a separate file. This feature can be used on any number of different weapons. Therefore, the sportsperson can sight-in the system in relation to a particular weapon, once, and save the configuration. From then on the sportsperson can move the display between multiple weapons, mount the display, chose the particular weapons saved configuration, and the weapon, without further adjustments or sighting-in being required, becomes fully sighted-in and accurate. No mechanical adjustments are required.

Figure 15:
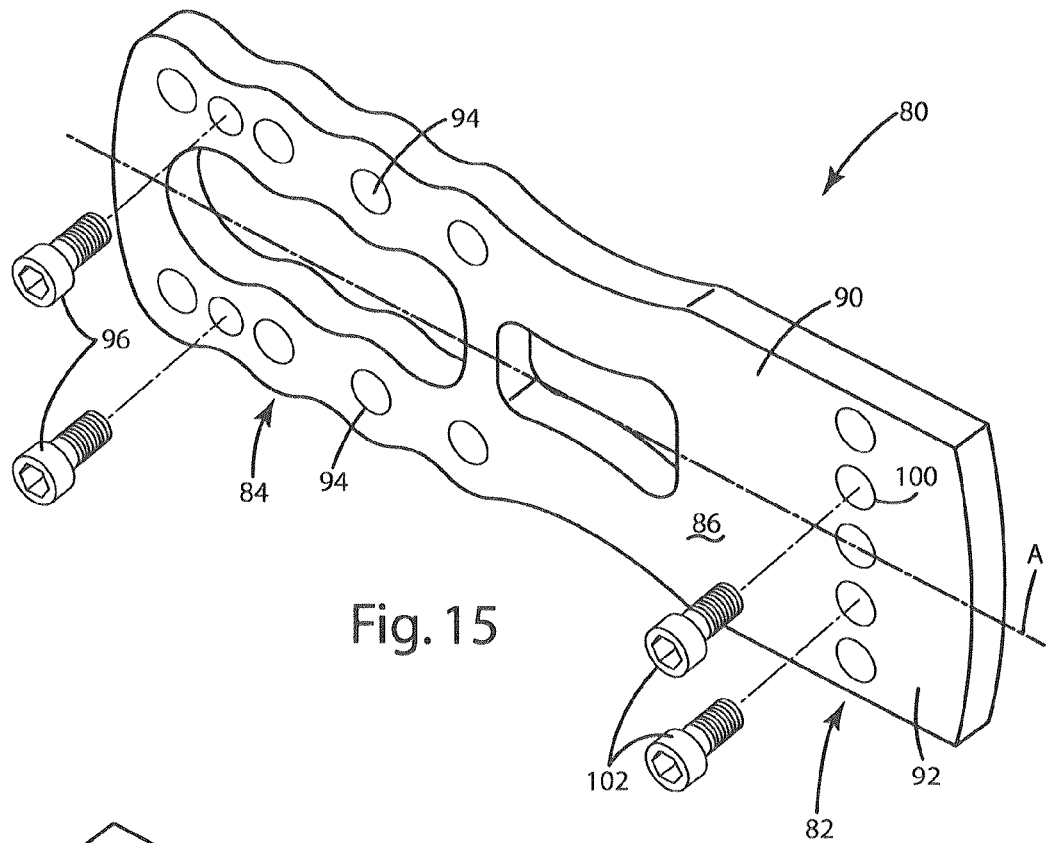
FIG. 15 is a perspective view of the mounting bracket according to one embodiment of the present invention.
Figure 16:
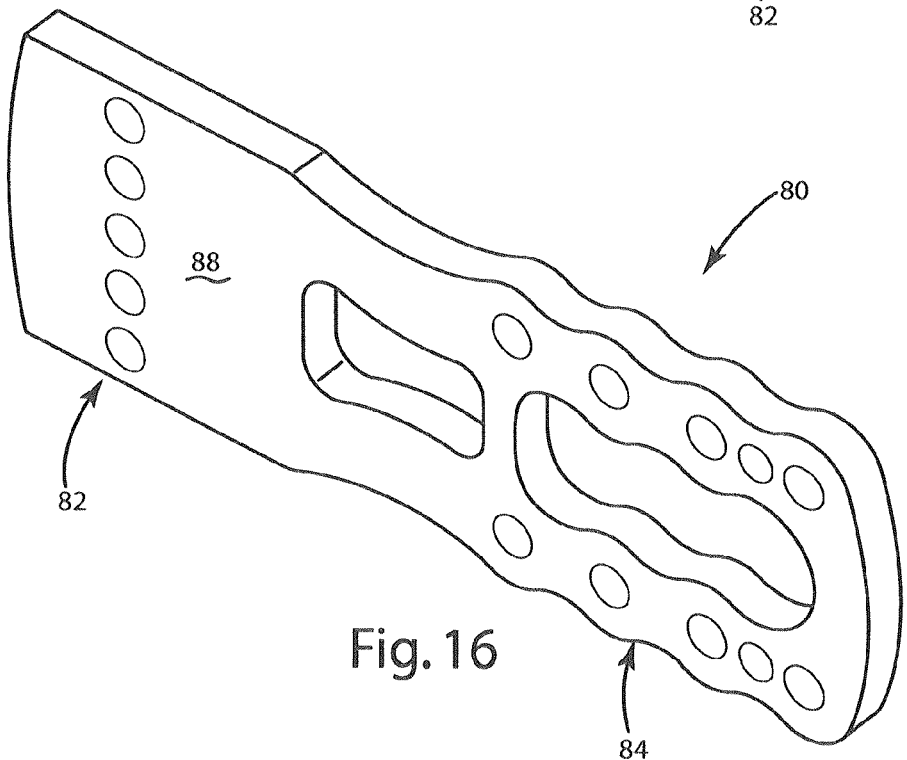
FIG. 16 is a perspective view of the opposite side of the mounting bracket of FIG. 15 according to one embodiment of the present invention.
Figure 17:
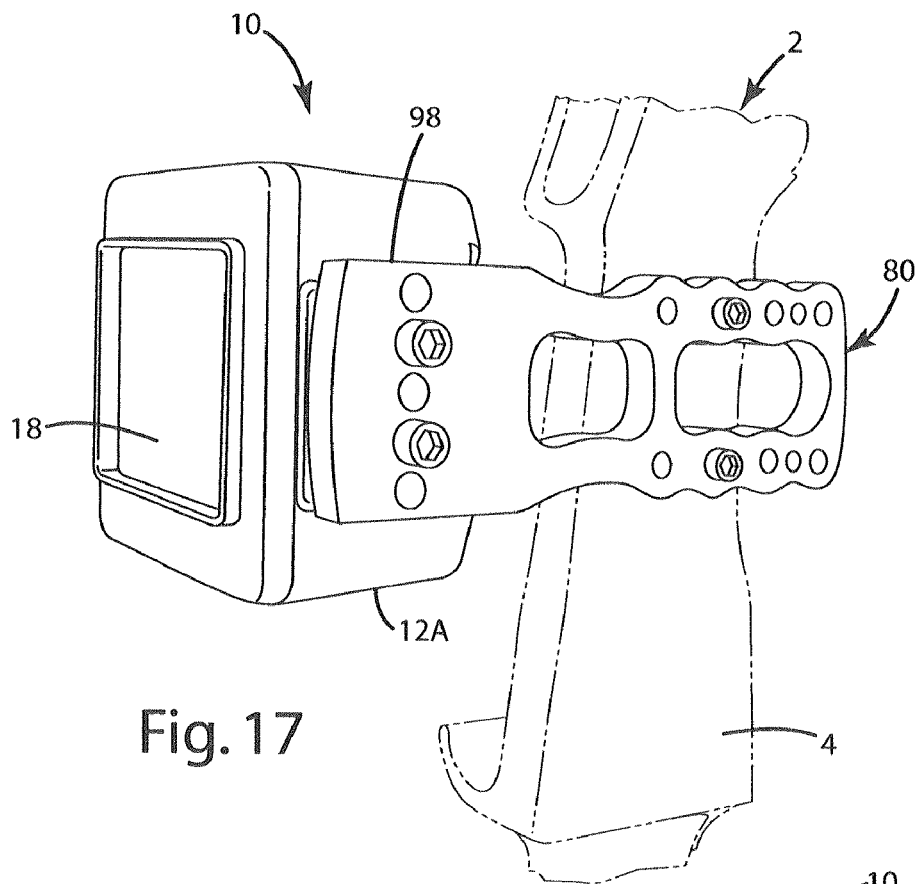
FIG. 17 is a rear partial perspective view of an embodiment of the weapon site of the present invention, mounted to a right handed bow with the display in an aft position.
Figure 18:
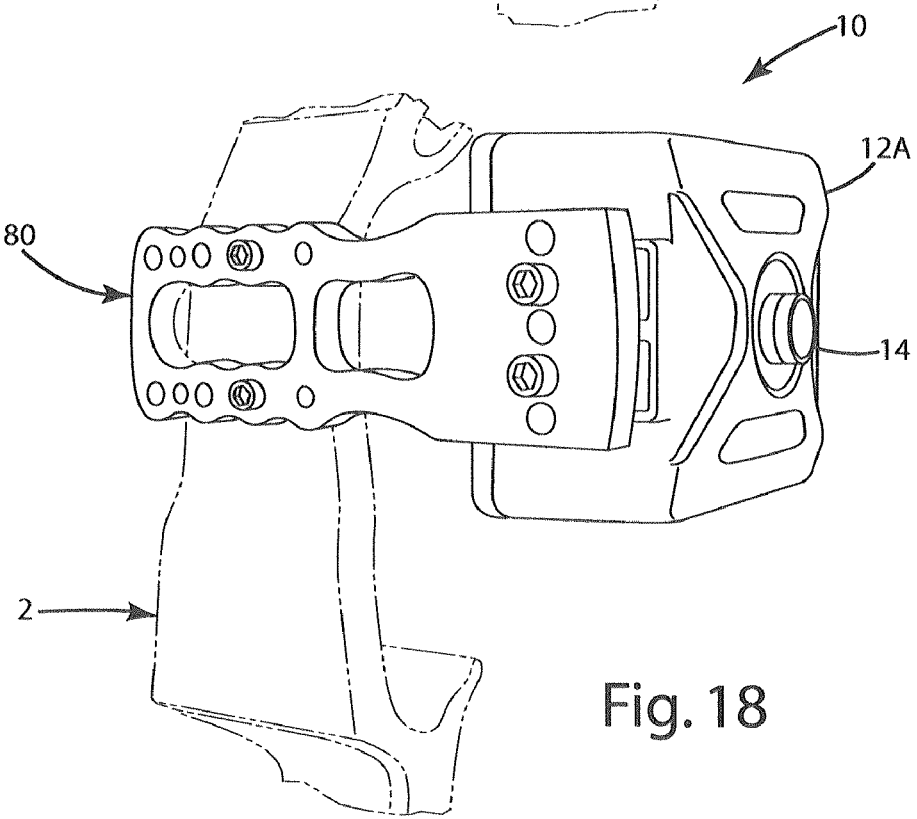
FIG. 18 is a front partial perspective view of an embodiment of the weapon site of the present invention, mounted to a right handed bow with the display in an forward position.
Figure 19:
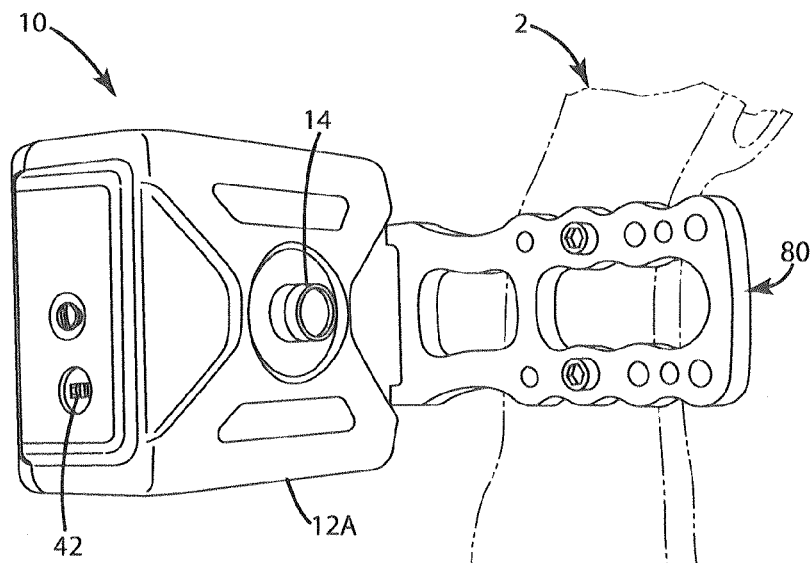
FIG. 19 is a rear partial perspective view of an embodiment of the weapon site of the present invention, mounted to a left handed bow with the display in an aft position.
Figure 20:
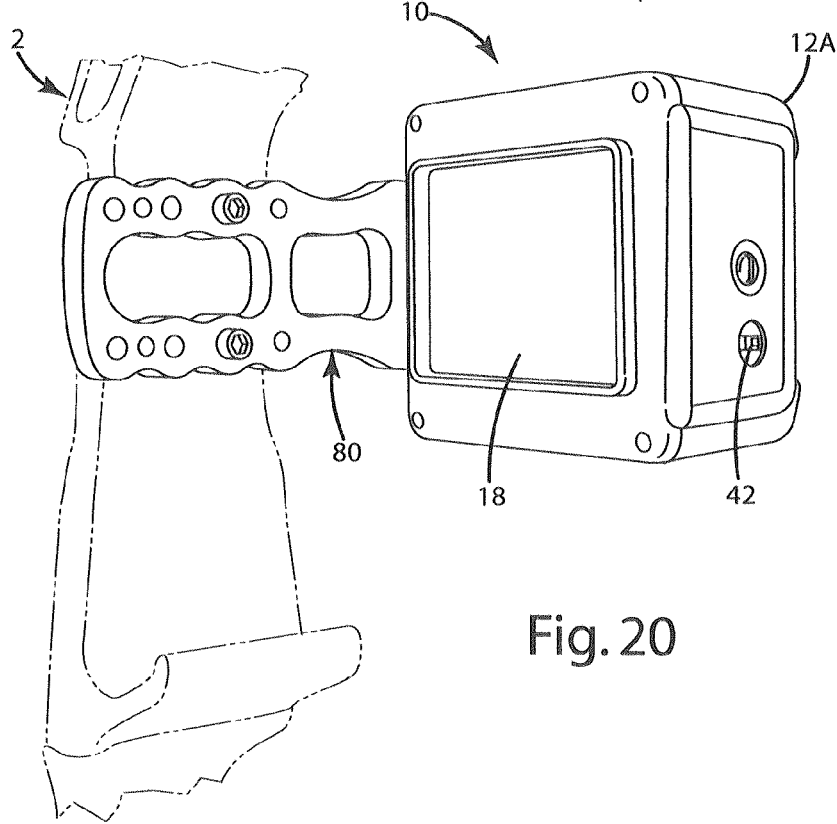
FIG. 20 is a rear partial perspective view of an embodiment of the weapon site of the present invention, mounted to a left handed bow with the display in an forward position.

FIGS. 15-16 illustrate a video sight mounting bracket 80 for a bow 2 comprising a reversible video sight mounting bracket 80 comprising a housing mount portion 82 and a riser mount portion 84 wherein the housing mount portion 82 is adapted to retain a video sight housing 12 and the riser mount portion 84 is adapted to be mounted to the riser 4 of a bow 2. The mounting bracket 80 further comprising a first and a second side, 86 and 88 respectively, and a longitudinal axis A defining a first and a second half, 90 and 92 respectively, wherein the first side 86 is a mirror image of the second side 88, and the first half 90 is a mirror image of the second half 92. In one embodiment, the mounting bracket 80 is adapted to be positionable on a riser 4 via a plurality of mounting holes 94 that may accommodate one or more fasteners 96.

FIGS. 17-20 illustrate an embodiment of an ambidextrous video sight assembly for a bow and comprises the aforementioned mounting bracket 80 wherein the housing mount portion 82 is adapted to a video sight housing 12A, and the riser mount portion 84 is adapted to mount to at least one of a left or a right side of a bow 2. The video sight housing 12A comprises the video display unit 18A which is adapted to electronically rotate the displayed image 180 degrees. The housing 12A further includes a single mountable side 98 adapted to mount the housing 12A to the housing mount portion 82 of mounting bracket 80. In this manner, the video display 18A may be mounted to the bow 2 in any one of a forward, aft, left and right side position (as illustrated in FIGS. 14-17) of a riser 4 of bow 2 via the single mountable side 98. As illustrated, one embodiment of the bracket 80 is positionable on the riser via a series of mounting holes 94 that may accommodate one or more fasteners 96, whereas the housing 12A is positionable on the bracket 80 via a series of mounting holes 100 that may accommodate one or more fasteners 102.

The inventive weapon site includes a novel method of sighting a weapon which includes the steps of:

providing a weapon sight 10 comprising a video camera 14 for generating a first video signal or image 24 corresponding to a first field of view 26;

providing a processor 16 for processing the first video signal 24 into a second video signal or image 28 corresponding to a second field of view 30. In one embodiment, either the video camera 14, the processor 16, or the display 18 may also comprise video or still image recording capability. Further, in one embodiment, the display comprises a touch screen display for input by the user; receiving the first video signal 24 comprising the first field of view 26;

processing the first video signal 24 comprising the first field of view 26 into the second video signal 28 comprising the second field of view 30; outputting the second video signal 28 to a video display 18;

displaying the second video signal 28 on the display 18. While not required, in one preferred embodiment the second video signal 28 is processed to have a smaller field of view 30 as compared to the first field of view 26. For example, the second field of view 30 may comprise 25% of the first field of view 26 wherein this reduced field of view will typically, in this example, comprise an area that is centrally located within the first field of view 26;

displaying a reticle 20 on the display 18. While not required, reticle 20 may be centrally disposed and fixed with respect to the display 18 and may be centrally fixed electronically or physically. For example, the reticle 20 may comprise a dot or other marking centrally disposed on display 18 via the processor 16, or alternatively, in one embodiment, the reticle 20 may comprise a physical mark disposed on the exterior of display 18 and for example only, may comprise a sticker;

establishing a first point of reference 32 on the display 18 representative of a desired position on a target 6 by positioning the reticle 20 at the desired position;

shooting a projectile at the desired position on the target 6 by releasing or firing the projectile when the reticle 20 is positioned on the desired position of the target 6;

establishing a second point of reference 34 on the display 18 representative of an actual position of the landed projectile on the target 6, while simultaneously positioning the reticle 20 on the first point of reference 32. In one embodiment establishing the second point of reference 34 is accomplished through the touch screen LCD by positioning a locator mark 36 on the actual position of the landed projectile, where the locator mark is moved to the actual position via inputs programmed into the touch screen display;

determining an offset 38 of the second point of reference 34 in relation to the first point of reference 32. The offset may be determined electronically by measuring or calculating the pixel offset, as measured or calculated on display 18 in a bi-directional manner. That is to say, if display 18 comprises both X and Y coordinates, the pixel offset will include both the offset in the X direction and the Y direction in order to determine the bi-directional offset between the first and second points of reference, 32 and 34 respectively;

offsetting one of the first or the second video signals, 24 and 28 respectively, with respect to other of the second or first video signal, 28 and 24 respectively, by the offset 38 such that the second point of reference 34 coincides with the first point of reference 32; and displaying the now coincident reticle 20 on the display 18.

Still further, the inventive weapon site also includes a method of sighting a weapon which includes the steps of:

providing a weapon sight 10 comprising a video camera 14 for generating a video signal 24, and a display 18;

displaying the video signal 24 on the display 18; establishing a first point of reference 32 via the display representative of a desired position on a target 6;

establishing a second point of reference 34 via the display 18 representative of an actual position of a landed projectile on the target 6;

determining an offset 38 between the second point of reference 34 and the first point of reference 32 via the display.

Again, in one embodiment, the offset may be determined electronically by measuring or calculating the pixel offset, as measured or calculated on display 18 in a bi-directional manner. That is to say, if display 18 comprises both X and Y coordinates, the pixel offset will include both the offset in the X direction and the Y direction in order to determine the bi-directional offset between the first and second points of reference, 32 and 34 respectively; and offsetting the video signal 24 on the display 18 by the determined offset 38. Offsetting the video signal may comprise electronically shifting the image or video signal by the corresponding bi-directional determined offset.

The inventive weapon site also includes a novel method of sighting a weapon comprising the steps of:

providing a weapon sight comprising a video camera for generating a video signal, a display, a processor, and a non volatile memory;

displaying the video signal on the display;

displaying a reticle on the display, wherein the reticle, in one embodiment, may be adjustable;

establishing a first point of reference, coincident with the reticle, representative of a desired position on a target;

establishing a second point of reference representative of an actual position of a landed projectile on the target;

determining an offset between the second point of reference and the first point of reference;

offsetting one of the reticle or the video signal by the determined offset, wherein in one embodiment, the video signal is offset;

storing the determined offset in the non volatile memory for use at a later time;

recalling the stored determined offset after the weapon sight has been powered off; and displaying one of the reticle or the video signals by the stored determined offset, thereby giving the sportsperson the ability to maintain a fully sighting-in weapon and further giving the sportsperson the ability to mount the sight on numerous weapons, sighting-in these numerous weapons once and saving the sighted-in data, and recalling the particular saved or stored, sighted-in data, such that the numerous weapons need not be re-sighted-in. For example, when the mount is moved between weapons, the sight simply needs to be mounted to the particular weapon, the particular weapons saved data is recalled, and the weapon becomes immediately fully sighted-in and requires no additional effort or shooting on the part of the sportsperson.

Figure 21:
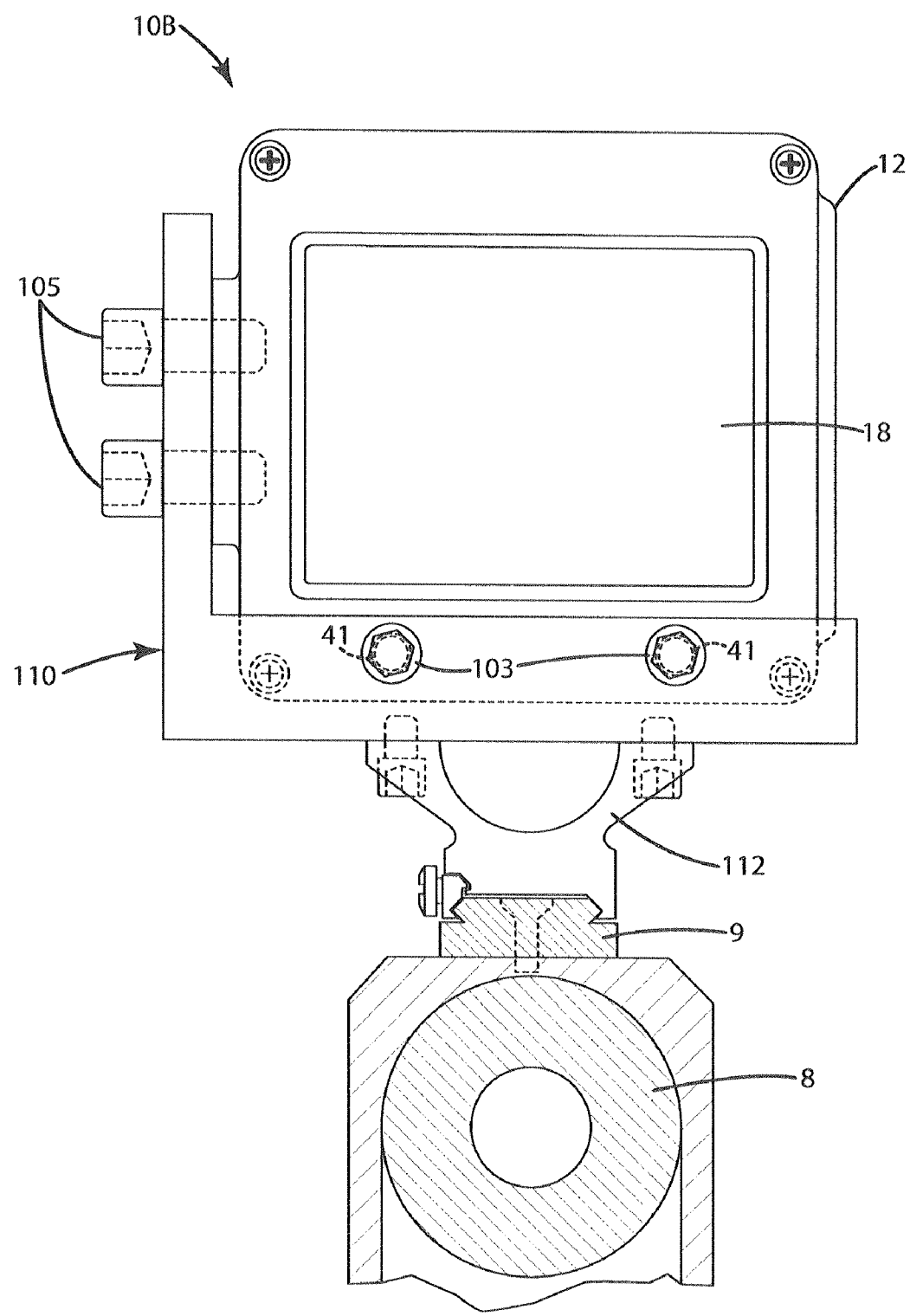
FIG. 21 is a sectional front view of an embodiment of the weapon site of the present invention mounted to a gun.

FIG. 21 illustrates a weapon site 10B comprising mounting bracket 110 that may be used to mount the sight 10 to a gun or other barreled weapon 8. In this particular configuration, mounting features 40 and 41 of display housing 12 may be used to mount the housing 12 to the gun 8 through the mounting bracket 110, an adapter 112, and, for example, fasteners 103 and 105. While any known mounting features 40 and 41 may be utilized, illustrated in FIGS. 21-22 are threaded receptacles 40 and 41 for receiving a threaded fasteners 103 and 105 therethrough. Further, in one embodiment, the adapter 112 of mount 110 is configured to mount with a Weaver Rail type system 9 disposed on the gun 8.

Advantageously, the electronic weapon site and method thereof of the present invention provides a fully featured weapon site that is accurate and easy to use. It also is easily adaptable for use on both left-handed and right-handed weapons by providing a display that rotates by 180 degrees and a mounting bracket that is symmetrical.

The solutions offered by the invention disclosed herein have thus been attained in an economical, practical, and facile manner. To with, a novel electronic weapon site which is cost effective, and easily used and configured, and highly adaptable has been invented. While preferred embodiments and example configurations of the inventions have been herein illustrated, shown, and described, it is to be appreciated that various changes, rearrangements, and modifications may be made therein, without departing from the scope of the invention as defined by the claims. It is intended that the specific embodiments and configurations disclosed herein are illustrative of the preferred and best modes for practicing the invention, and should not be interpreted as limitations on the scope of the invention as defined by the claims, and it is to be appreciated that various changes, rearrangements, and modifications may be made therein, without departing from the scope of the invention as defined by the claims.

The invention claimed is:

1. A weapon sight to facilitate alignment a weapon with a target, the weapon sight comprising:
   a housing, the housing further comprising a video camera for generating a first video signal corresponding to a first field of view;
   a processor for processing the first video signal into a second video signal corresponding to a second field of view, and outputting the second video signal to a video display;
   a reticle disposed on the video display;
   wherein one of the first or the second video signals is electronically positionable with respect to other of the second or first video signal.

2. The weapon site according to claim 1, wherein:
   the second field of view is less extensive than the first field of view thereby corresponding to a cropped video of the first field of view.

3. The weapon site according to claim 1, wherein:
   the second field of view is reduced to 25% of the first field of view.

4. The weapon site according to claim 1, wherein:
   the second video signal is electronically rotatable on the video display.

5. The weapon site according to claim 4, wherein:
   the memory comprises removable memory.

6. The weapon site according to claim 1, wherein:
   the processor includes memory for storing one of the first or the second video signals.

7. The weapon site according to claim 1, wherein:
   the video comprises a single image.

8. The weapon site according to claim 1, wherein:
   the display comprises a touch screen display.

9. The weapon site according to claim 1, wherein:
   the frame rate of the video camera is adjustable from a range of from 30 frames per second to 1 frame per second.

10. The weapon site according to claim 1, wherein:
    the weapon is a bow.

11. The weapon site according to claim 1, wherein:
    the display displays more than one reticle.

12. The weapon site according to claim 1, wherein:
    the reticle is stationary and centrally disposed on the display.

13. A bow sight to facilitate alignment with a target, the bow sight comprising:
    a housing, the housing further comprising a video camera for generating a first video signal corresponding to a first field of view;
    a processor for processing the first video signal into a second video signal corresponding to a second smaller field of view and outputting the second video signal to a touch screen video display;

a stationary reticle centrally disposed on the video display;
wherein the first video signal is electronically positionable with respect to the second video signal through user inputs via the touch screen display.

14. The bow sight according to claim 13, wherein:
the second field of view is reduced to 25% of the first field of view.

15. The bow sight according to claim 14, wherein:
the second video signal is electronically rotatable on the video display.

16. A method of sighting a weapon comprising:
providing a weapon sight comprising a video camera for generating a first video signal corresponding to a first field of view, a processor for processing the first video signal into a second video signal corresponding to a second field of view;
receiving the first video signal comprising the first field of view;
processing the first video signal comprising the first field of view into the second video signal comprising the second field of view;
outputting the second video signal to a video display;
displaying the second video signal on the display;
displaying a reticle on the display;
establishing a first point of reference representative of a desired position on a target by positioning the reticle at the desired position;
establishing a second point of reference representative of an actual position of a landed projectile on the target, while simultaneously positioning the reticle on the first point of reference;
determining an offset of the second point of reference in relation to the first point of reference;
offsetting one of the first or the second video signals with respect to other of the second or first video signal such that the second point of reference coincides with the first point of reference;
displaying the coincident reticle on the display.

17. The method according to claim 16, wherein:
the second field of view is less extensive than the first field of view.

18. The method according to claim 16, wherein:
the receiving step includes recording the first video signal.

19. The method according to claim 16, wherein:
the displaying step includes displaying a fixed and centrally positioned reticle on the display.

20. The method according to claim 16, wherein:
the display comprises a touch screen display having user inputs for establishing the second point of reference.

21. The method according to claim 16, wherein:
the determining step further comprises determining the offset by calculating the pixel offset of the first point of reference and the second point of reference.

22. The method according to claim 16, further comprising the step of:
storing the determined offset in a non volatile memory.

23. A weapon sight to facilitate alignment a weapon with a target, the weapon sight comprising:
a housing, the housing further comprising a video camera for generating a first video signal corresponding to a first field of view, the housing further comprising a display;
an reticle disposed on the display;
a processor for processing the first video signal into a second video signal corresponding to a second field of view, and outputting the second video signal to a video display;
a non volatile memory for storing the position of at least one of the reticle disposed on the display and the first or the second video signal;
wherein one of the first or the second video signals is electronically positionable with respect to other of the second or first video signal.

24. The method according to claim 23, wherein further:
the reticle is electronically adjustable and the non volatile memory.

\* \* \* \* \*